United States Patent [19] | [11] Patent Number: 4,906,135
Brassow et al. | [45] Date of Patent: Mar. 6, 1990

[54] METHOD AND APPARATUS FOR SALT DOME STORAGE OF HAZARDOUS WASTE

[76] Inventors: Carl L. Brassow, 11603 Sandstone, Houston, Tex. 77072; S. John Welsh, 326 W. Alkire Lake Dr., Sugarland, Tex. 77478; David C. Stang, 401 Lakeside La. #204, Nassau Bay, Tex. 77058

[21] Appl. No.: 294,909

[22] Filed: Jan. 6, 1989

Related U.S. Application Data

[63] Continuation of Ser. No. 149,973, Feb. 4, 1988, abandoned, which is a continuation of Ser. No. 813,012, Dec. 24, 1988, abandoned.

[51] Int. Cl.$^4$ .............................................. B65G 15/00
[52] U.S. Cl. ...................................... 405/128; 405/53; 405/54
[58] Field of Search ......................... 405/52, 53, 54, 58, 405/128, 129, 258, 266

[56] References Cited

U.S. PATENT DOCUMENTS

| | | | |
|---|---|---|---|
| 2,710,232 | 6/1955 | Schmidt et al. | 405/258 X |
| 2,961,841 | 11/1960 | Giles | 405/59 X |
| 3,088,717 | 5/1963 | Myers | 405/58 X |
| 3,236,053 | 2/1966 | Billue . | |
| 3,250,326 | 5/1966 | Witherspoon . | |
| 3,262,274 | 7/1966 | Nelson . | |
| 3,355,893 | 12/1967 | Kuhne | 405/59 X |
| 3,375,666 | 4/1968 | Sutton . | |
| 3,513,100 | 5/1970 | Stogner . | |
| 3,665,716 | 5/1972 | Rogers | 405/128 |
| 3,706,630 | 12/1972 | Cohen et al. | 405/128 X |
| 3,724,898 | 4/1973 | Jacoby | 405/58 X |
| 3,745,770 | 7/1973 | Fraser . | |
| 3,768,865 | 10/1973 | Dehn . | |
| 3,807,181 | 4/1974 | Kuhne . | |
| 4,274,880 | 6/1981 | Chappell | 210/751 |
| 4,313,824 | 2/1982 | Huss et al. | 210/170 |
| 4,320,028 | 3/1982 | Leuchtag | 405/128 X |
| 4,366,063 | 12/1982 | O'Connor | 210/170 |
| 4,388,186 | 6/1983 | Fujimoto et al. | 210/170 |
| 4,429,746 | 2/1984 | Allard | 405/128 |
| 4,488,834 | 12/1984 | Hooper et al. | 405/58 |
| 4,576,513 | 3/1986 | Lindorfer et al. | 405/128 |
| 4,577,999 | 3/1986 | Lindorfer et al. | 405/128 X |
| 4,692,061 | 9/1987 | Lindorfer et al. | 405/128 |

OTHER PUBLICATIONS

J. Geiselman, The Houston Lawyer, Salt Dome Storage of Hazardous Wastes, May 1983, pp. 14–19.

Primary Examiner—Dennis L. Taylor
Attorney, Agent, or Firm—Pravel, Gambrell, Hewitt, Kimball & Krieger

[57] ABSTRACT

A method and apparatus for disposal of hazardous waste and other waste materials in salt formations is disclosed herein comprising the steps of: leaching out a cavity in a salt formation; installing a plurality of concentric disposed casings, one inside the other, down into the cavity and securing them in place; receiving the waste material in the form of organic and inorganic solids, semi solids liquids, sludges, hydrocarbons, solvents and waste water, separating the waste constituents and temporarily storing them in their respective storage tanks; transferring the waste material to a solification unit; solidifying the waste material and injecting said solidified materials down into the cavity within the salt formation; filtering the waste water through a series of filters prior to disposing of the waste water.

14 Claims, 4 Drawing Sheets

METHOD AND APPARATUS FOR SALT DOME STORAGE OF HAZARDOUS WASTE

"This is a continuation of co-pending application Ser. No. 149,973 filed on Feb. 4, 1988, which" and by deleting the word "this", previously the first word of the specification.

BACKGROUND OF THE INVENTION

1. Field of the Invention

The present invention relates to a method and apparatus for storage of hazardous waste in underground cavities or caverns leached out of underground salt formations.

2. Description of the Prior Art

In recent years it has been a growing realization among industry leaders, government leaders and society in general that industrial pollution is an issue that must be dealt with positively and effectively. In 1969 the National Environmental Policy Act (N.E.P.A.) was signed into law which committed the Federal Government to a policy of considering the environmental impact of federally funded or sponsored projects on the surrounding environment and society. Since that time, a host of environmentally oriented laws have been passed which treat the subjects of clean air, clean water, toxic substances, safety in the workplace and more recently, with the passage of the Resource Conservation and Recovery Act (R.C.R.A.) of 1976 the issue of hazardous waste disposal. This act was in response to the recognition that hazardous waste had generally been disposed of in environmentally unacceptable ways; that past practices have largely been ineffective in constraining the waste to established disposal sites; or worse yet, disposal was indiscriminate, resulting in widespread pollution, both of land surface and surface water. Evidence now indicates that prevalent ground water contamination has occurred by existing disposal practices.

Numerous surveys and even Congressional investigations have shown that thousands of generators exist in the United States and that millions of tons of hazardous and toxic waste have been produced and disposed of in various ways, some in controlled manners, but much in uncontrolled manners. A recent survey conducted by a major research firm forecast that there will be 285,000,000 tons of hazardous waste produced by the 1990's and that the market for the amount of growth will be around 16% per year during the 1980's. This report further indicates that the implementation of the R.C.R.A. will accelerate the growth of hazardous waste to be disposed of in the future. Proper hazardous waste disposal will further accelerate when abandoned toxic waste dump sites are mandated to be cleaned up under the government's Superfund program.

Many factors have now created a need for high quality hazardous waste disposal programs. Hazardous waste storage continues to dominate the headlines. The available supply of safe disposal sites is limited. The implementation of R.C.R.A. will force the closing of environmentally unsafe facilities. The shift to on site facilities by industry in the short term, will accelerate exhaustion of the on site capacity and increase pressure for off site disposal in the long term. Only about 100 of 16,000 current land disposal sites have impermeable liners. Possible contamination of drinking water aquifers are a major concern in heavily populated industrial cities.

Consequently, these factors have created a great need for improvements in hazardous waste disposal.

SUMMARY OF THE INVENTION

The present invention provides a method and apparatus for the storage of hazardous waste materials in underground salt formations designed to satisfy the aforementioned needs.

To fully appreciate the novelty of the present invention, one must reconsider the compelling advantages of salt formation storage. Contaminants can be perpetually incapsulated well beneath drinking water aquifers within huge virgin rock salt barriers unlike the notorious surface lagoons and landfills which will eventually leak and are gravity positioned such that their contaminants could migrate into the fresh water aquifers beneath them. Salt formations are nigh onto miraculous underground mountains of rock salt. In their infant stages, salt formations were laid down as massive salt beds in the Gulf Coast area when hundreds of millions of years ago the inland seas retreated. Over the aeons, sedimentary layers of denser materials were accumulated in thick layers above the salt bed. Because of salt's inherent plasticity and lighter density, the salt began pushing its way up through the sediments near the surface in the form of huge extrusions. Some formations are as large as 5 miles in diameter and 10 miles deep. Half of the 524 salt formations identified in the Gulf Coast area are offshore.

In addition to its great plasticity, formation salt is also strong, permeable and non-reactive. Formation salt is so strong that a 5 kiloton nuclear device set off inside the Tatum salt formation resulted in no breaching of the formation. Indeed, the salt cracked only one to two feet directly adjacent to the blast and the cement plug created to contain the detonation survived intact.

Salt impermeability is a function of its crystalline structure. This property results in salt being impervious to gases and chemicals. Currently, Gulf Coast salt formations in Texas, Louisiana and Mississippi hold close to $14 billion dollars in crude oil and chemical products (Liquids and gases, some under high pressure) with almost 100% recoverability. The entire U.S. Strategic Petroleum Reserve, over 300 million barrels of crude oil, is currently stored in salt formations.

Salt is non-reactive to virtually all chemicals with the exception of lithium and flourides in their concentrated forms. These waste streams should not be acceptable for disposal. The only other chemical that reacts with salt is water. Yet water has only a limited and very predictable effect on salt. It takes six to seven barrels of fresh water to dissolve one barrel of salt. When this ratio is reached the water becomes super saturated by the salt and is rendered impotent to dissolve the salt any further. Pockets of super saturated brine water have been discovered entombed perfectly contained in salt for over 200 million years. This same phenomenon will be at play when hazardous waste is permanently entombed in salt cavities.

The proposed invention calls for locating a salt formation with certain desired characteristics. Access to the salt formation is made by traditional oil and gas drilling techniques. The integrity of the casing program is critical to the integrity of any fresh water aquifers around the dome. Dropping the casing down to the surface of the formation involves the placing of a plurality of casings all cemented back to the surface. Once the casing string is set down into the salt formation, fresh water is withdrawn from nearby fresh water wells and injected into the formation by using existing solution mining techniques that have been developed over the years. This process will cause a disposal cavern to be leached out within the interior portion of the salt formation. Monitoring of the leaching process through seismic and gravity field work and sonar logs will enable accurate cavity placement in spacing configurations. It is anticipated that no cavity will be over 2,000 feet deep, no closer to the surface than approximately 1,500 feet and no developed edge of any cavity closer than 300 feet to the edge of any other cavity. Once the desired shape and size is achieved, the brine water is evacuated by means of submergeable pumps. Means are then provided for separating the various incoming waste product streams, solidifying the various waste products and injecting the solidified products down into the cavern within the interior of the salt formation.

The above ground surface support facilities will include as a minimum the following: an administration center; a receiving area for the waste material; a processing center including a laboratory; a solidification unit; a battery of pipe or conveyor lines, pumps and storage tanks; water wells for obtaining the water for the leaching process; an impoundment pond for storage of the water received from the water wells prior to using in the leaching process; brine disposal wells for disposing of the brine after it comes out of the leached cavity; and hazardous waste water disposal wells off the formation site for disposing of the filtered waste water if the water is not further treated and reused.

The three existing technologies for disposal of hazardous and toxic wastes (land treatment, deep well disposal and landfilling operations) all suffer certain disadvantages depending upon site, size and attitude of the surrounding landowners. The one major problem of greatest concern to all and common to all three systems is the possible pollution and contamination of ground water aquifers.

However, disposal of waste in salt formations has many distinct advantages. The first major advantage is that the salt formation provides the ideal entombment device for the storage of hazardous waste. As mentioned above, formation salt is extremely strong, impermeable and non-reactive. The salt formation's impermeability, being a function of its crystalline structure, results in its being impervious to gases and chemicals. The salt formation is non-reactive to virtually all chemicals with the exception of lithium and flourides in their concentrated forms.

Another advantage to the use of salt formations for the storage of hazardous waste is that the disposal zone would be below any ground water level. The cavern location within the formation would always be below the salt water-fresh water interface and thus there is no possibilty of contaminants reaching a potable ground water aquifer irrespective of the location of the formation. Even if the formation should pierce a known fresh water aquifer, the ground water immediately adjacent and overlying the formation is invariably saline and non-potable and is not used for any residential, commercial or industrial purpose.

Another advantage of salt formation storage is that salt formations are stable masses. Although the growth mechanism for a formation is such that the salt mass is pushed from the mother salt bed from great depths up to near the surface, having diameters generally in excess of one mile approaching three miles with little or no continuing vertical upper movement. Although the settlements and formations surrounding the formations are subjected to faulting, the formation themselves are continuous masses with the exception of those few formation that show differential growth patterns resulting in shear zone or spines within the salt masses themselves.

A further advantage to salt formation storage is that the formation itself is not subject to changes due to environmental changes outside of the formation structure. One aspect of concern in the siting and permitting of surficial or shallow landfill operations is the possibility of growth faults crossing or intersecting the landfill and later beginning to move. An associated problem is the one of surface subsidence to ground water and oil and gas removal. Surficial flooding from hurricanes and severe storms do not effect a formation site significantly because surface expression due to a salt zone is usually a topographic high resulting in a circular mound several feet above the surrounding ground surface and sometimes extending as much as tens of feet above the surrounding land surface, thus forming islands within a relatively flat lying coastal area. Although these other mechanisms do and will continue to occur, the salt formation is not affected by the changes, either in surface movement or will it be affected by any oil and gas production that may occur around the formation.

A still further advantage to salt formation storage is that salt formations are not affected by the presence of oil and gas operations. In the Gulf Coast, oil and gas production is generally associated with the presence of salt formations, not because production occurs within the salt formation, but because of the nature of the dome growth, it forms stratigraphic and structural traps where oil and gas have accumulated and thus account for the presence of oil and gas fields around salt formations. The presence or absence of oil and gas production will have little or no effect on facilities located within the salt formation.

Another advantage is that the use of a salt formation will optimize the surface area to volume capacity. Because a salt formation is almost infinitely deep compared to the depth required for disposal, formations allow for the maximum ratio of volume of capacity to surface area used. This has tremendous impact in the siting of surficial facilities, because not only is the price of land extremely costly, but as the surface area increases, the water management problem that is associated with large surficial area disposal facilities also increases.

A still further advantage to salt formation storage is that the disposal of hazardous waste in salt formations offers excellent security. Security can be analyzed in two aspects: one, surficial security, to secure the site from unauthorized intruders and exposure of hazardous toxic waste to surrounding residences or landowners; and two, subsurface security and the ability to contain a toxic and hazardous waste without exposure to environment. Because all of the hazardous waste materials will be stored in the formation itself, the above ground support facility will have a relatively small surface area. This will allow for a more secure facility, because only ancillary structures and essentially non-hazardous materials are exposed at the surface. All toxic wastes are pumped and injected into the formation. Thus, even if unauthorized intruders did enter, they would not be exposed to the materials that are inherent in any type of currently existing surficial treatment. Salt formations themselves are virtually impermeable plastic masses that have the ability under affects of heat and pressure to heal themselves, thus any waste injected into a leached cavern would be assured of not migrating to any extent past the cavern walls.

A still further advantage of hazardous waste disposal in salt formations is that it includes the option to incorporate reclamation in recovery technology. One of the premises of the R.C.R.A. was to encourage the conservation of our resources, including those that are commonly discarded as waste streams now. Disposal in a salt formation cavern allows for the growth and implementation of conservation and reclamation technology and thus waste streams today may be recovered and placed back into the industrial commerce stream again.

Another advantage to hazardous waste disposal in salt formations is that a minimal labor force would be used. One aspect of hazardous waste disposal technology today that must be considered is the exposure of the workers at these facilities to long term affects of the materials that they are handling. Thus, the larger the number of persons employed at a hazardous waste management facility, the higher the possibility of long term industrial hygiene affects. Disposal of materials in salt formations would require a minimal labor force because the large number of operators and various other support personnel associated with surficial facilities currently in use would not be needed and thus overall exposure would be reduced. Those persons engaged in leaching out caverns would be unaffected by the waste streams.

A further advantage of the present invention is that it has the capability of handling multiple waste streams. Hazardous waste streams are usually produced in three forms: either solids or sludges, aqueous based or oil based. Disposal in a salt formation allows for the combination of any kind of waste stream.

Thus, hazardous waste disposal in salt formations has many advantages over the prior art methods of disposal as outlined above.

BRIEF DESCRIPTION OF THE DRAWINGS

The invention will be hereinafter more fully described with reference to the accompanying drawings in which.

DESCRIPTION OF THE PREFERRED EMBODIMENT(S)

Figure 1:
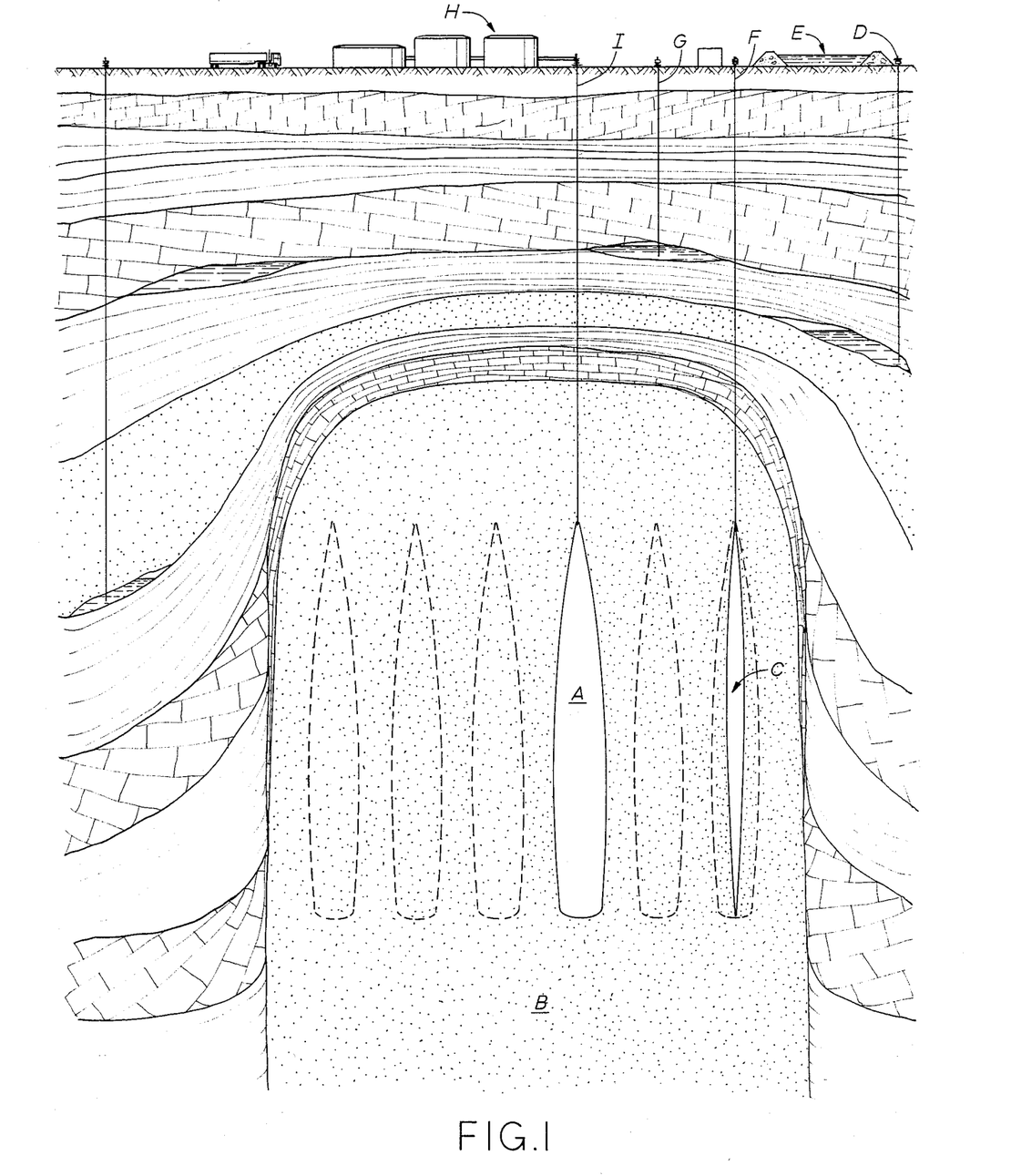
FIG. 1 is an overall perspective cross sectional view through the earth showing the caverns inside the salt formation and the above surface support facility.

Referring now to the drawings, and more particularly to FIG. 1, a cross section of the earth is illustrated depicting a cavity A within the interior of a salt formation B. Cavity A was previously leached out by solution mining techniques well known in the art. Cavity C is shown in the initial stages of being leached out. Water is withdrawn from the earth from well D and stored in an impoundment pond E. Water from the impoundment pond E is then injected into the cavity C through the well F. After cavity C obtains its desired shape, the brine is pumped out of the cavity and injected into disposal wells G. This then leaves cavity A ready to receive hazardous waste materials. Above ground support facilities H provide for the receiving and processing of the waste materials. After the waste materials have been processed, they are then injected down into cavity A through the injection well I.

Figure 2:
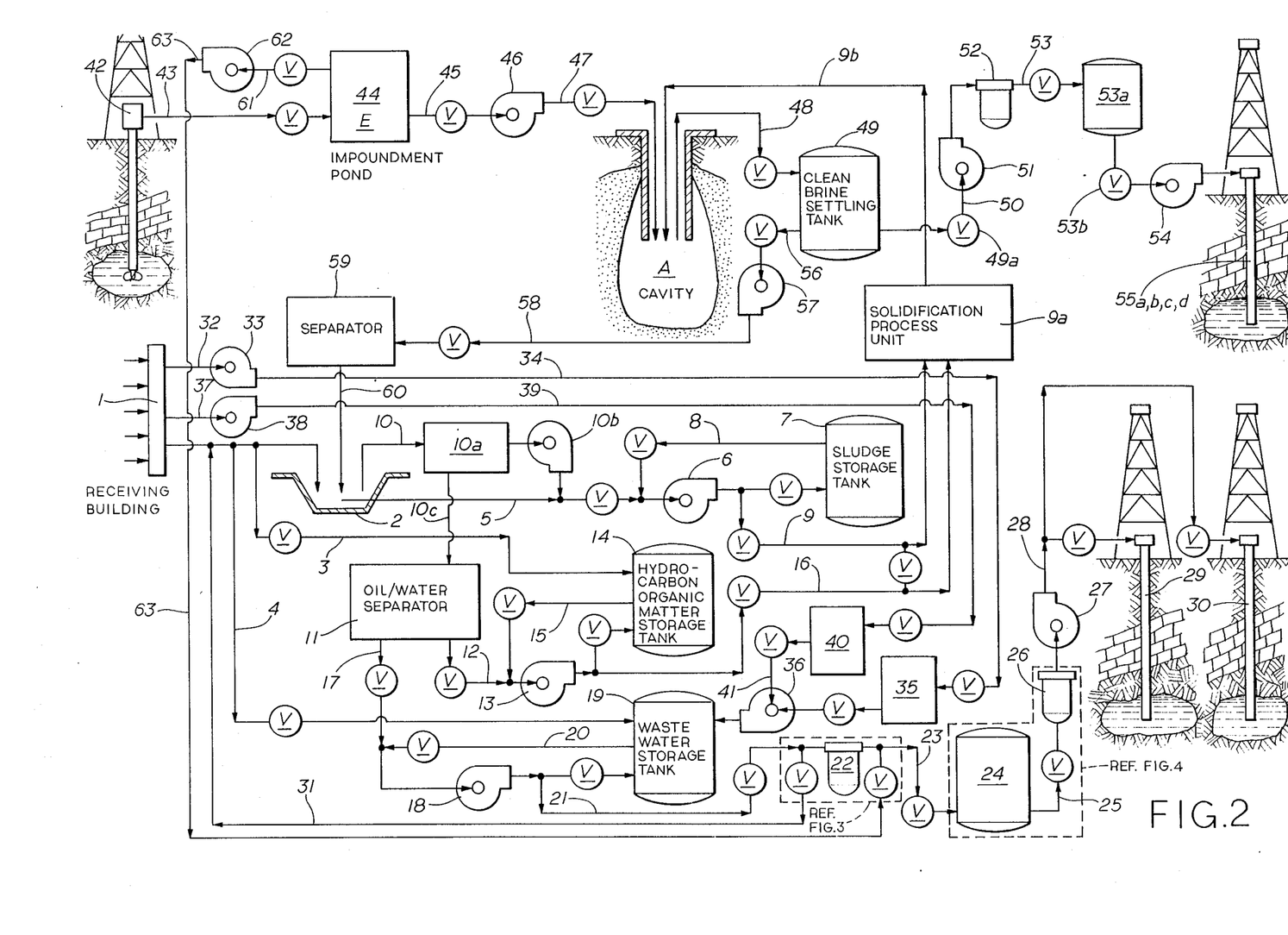
FIG. 2 represents a process flow sheet within the contemplation of the present invention.

Referring now to FIG. 2, the process of an embodiment of the present invention is illustrated. The waste in any form comes into the receiving building 1 where administrative details are carried out such as checking the waste type and so forth. Once the waste is accepted and is compatible with all of the other waste in the plant, it is then discharged into a first separating means such as but not limited to a waste separator pit 2. A decision can be made before the waste is discharged into the pit 2 if it is a single phase waste such as an oil stream, a sludge stream or a waste water stream. Line 3 will allow oil to be transferred directly to the hydrocarbon or organic matter storage tank 14. Bypass line 4 will allow single phase water waste to be transferred directly to the waste water storage tank 19. The waste transferred through line 3 is not necessarily oils but can be any kind of hydrocarbon or organic waste material. Incoming waste material will be in the form of either organic and inorganic solids, semi-solids, liquids, sludges, hydrocarbons, solvents and waste water or any combination thereof. Sludges are transferred through line 5 to the sludge transfer pump 6 which further transfers the sludges to a sludge storage tank 7. The sludge storage tank 7 could be one tank or a series of tanks. The sludges are then transferred through line 8 via the sludge transfer pump 6 through line 9 to a solidification process unit 9a. In the solidification process unit 9a the sludge is mixed with proprietary chemical agents and pozzolanic materials, such as fly ash, thus forming a very hard rigid solidified waste. In practice the waste material will be pumped into the cavern A through line 9b prior to becoming solidified. The solidification process unit 9a itself consists of chemical storage units, a large mixing unit, the pozzolanic storage silos and transfer pumps.

Most waste streams come in as a multi-phase waste stream. That is they have water, sludges, hydrocarbons and oils mixed in with them. Therefore, the purpose of the separator pit 2 is to separate out the phases of the various waste streams. The sludges will tend to go to the bottom of the pit and the oils and the water are skimmed off the top of the separator pit.

The oils and water are then transferred out of the separator pit 2 through line 10 to a centrifuge 10a. The purpose of the centrifuge 10a is to take out any other solids or sludges that may have been in line 10. Transfer pump 10b would then transfer these sludges to line 5 for transfer to the sludge storage tank 7. The oils and water coming out of the centrifuge 10a are then transferred directly to a second separating means such as but not limited to an oil water separator 11 through line 10c which separates out the oil from the water. The oils are then transferred from the oil water separator 11 through line 12 by means of an oil transfer pump 13 to the hydrocarbon and organic oil storage tank 14. The oils can then be transferred through line 15 back through the oil transfer pump 13 to line 16 to the solidification process unit 9a. Those oils are then solidified as described above. The solidified oils are then transferred through line 9b to the cavity A.

Figure 3:
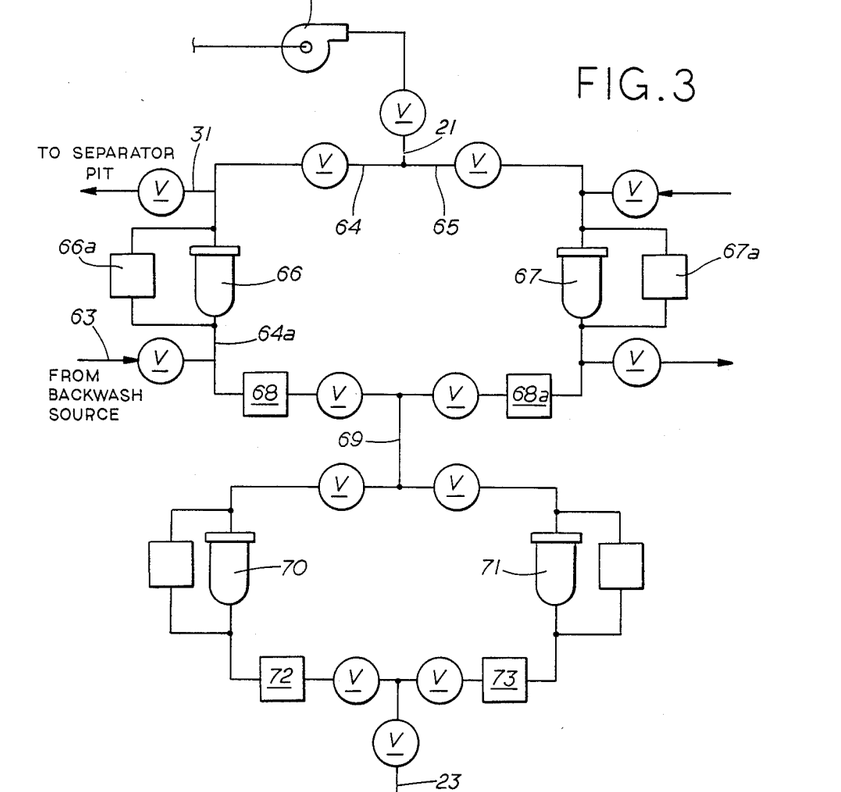
FIGS. 3 and 4 illustrate the details of the water filtration system as one the process represented in FIG. 2.

The water waste leaves the oil water separator 11 through line 17 and is transferred by water pump 18 to the waste water storage tank 19. A return line 20 allows the waste water to be pumped from the waste water storage tank 19 by means of a water pump 18 through line 21 to a filtration system 22 which is illustrated in FIG. 3 and explained in more detail below. The waste water then continues through line 23 to a waste water breakout storage tank 24. The waste water continues through line 25 through a polishing filter 26 which is referenced in FIG. 4 and also explained in detail below. The waste water is then transferred through the waste water injection pump 27 through line 28 into hazardous waste water disposal wells 29 and 30. Line 31 is a back wash line from the filtration system 22 to back wash the sand filters of the filtration system 22 and the back wash water is then directed back into the separator pit 2 thus allowing any sludges from the backwash to be taken out through the system.

The process, as illustrated in FIG. 2, can also accept single phase acid or caustic waste streams in which case the acid and caustic streams are then bypassed around the separator pit 2 directly to acid and caustic storage tanks. Acid would then enter line 32 from the receiving building 1 and be transferred by transfer pump 33 through line 34 to an acid storage tank 35. The acid is then transferred from the acid storage tank 35 by means of transfer pump 36 to the waste water storage tank 19 to neutralize the waste water in the waste water storage tank 19. Similarly, the same thing can occur with caustic. Caustic would enter line 37 from the receiving building 1 and be transferred via transfer pump 38 through line 39 to the caustic storage tank 40. The caustic then leaves the caustic storage tank 40 through line 41 by means of common transfer pump 36 to the waste water storage tank 19. The acids and caustics are used to balance out the pH of the waste water itself to a near neutral condition so that a neutral stream will be going down into the caverns.

Leaching water wells 42 are drilled off the dome to obtain water which is used in the leaching process forming the cavity. Water comes from the leaching wells 42 (illustrated as D in FIG. 10 through transfer line 43 to a brackish water impoundment pond 44 (illustrated as E in FIG. 1). The water is then transferred from the brackish water impoundment pond 44 through line 45 the leaching pump 46 and through line 47 to the cavern A (in FIG. 1) that is being developed. The water is pumped down into the cavern and returns through line 48 to a clean brine settling tank 49. This clean brine is transferred through line 50 via transfer pump 51 to a filtration system 52. The clean brine continues from the filtration system 52 through line 53 to a break out tank 53a. The clean brine is further transferred through a polishing filter 53b by the injection pump 54 and to the brine disposal wells 55 A, B, C and D. Break out tank 53a, polishing filter 53b and transfer pump 54 is a similar system to the waste water break out storage tank 24, polishing filter 26 and waste water injection pump 27.

Clean out line 56 runs from the clean brine settling tank 49 through a particulate slurry transfer pump 57 and through transfer line 58 to a separator 59. The stream then continues through line 60 back to the separator pit 2.

Water used for back washing all of the filters in the filtration system is obtained from the brackish water impoundment pond 44. This water leaves the storage pond 44 through line 61 by means of transfer pump 62 through line 63 to the filtration system 22 as further illustrated in FIG. 3, and is used to back wash the sand filters, hereinafter described, to remove all of the solids that may have collected in the filters. All of the solids that are removed from the filters are then transferred through line 31 back to the separator pit 2.

FIG. 3 illustrates in detail the filtration system 22. Waste water comes in from the waste water storage tank 19 through pump 18 through line 21. The filtration system 22 is a redundant system. The stream can be split at this point and go to either one of the two filtration systems. Both are identical so an explanation is just needed for one. The water is transferred through line 64 to the sand filter 66 which removes any solids. The water then leaves the sand filter 66 and goes through a guard screen 68 through line 64a which is merely a screen which would prevent any large piece of insoluble material getting into the next level of filtration. The stream then continues through line 69 which again is diverted into two more redundant systems as illustrated. The water line then continues through a cartridge filter 70, through another guard screen 72 and exits into line 23 which takes the stream to the waste water break out storage tank 24 as shown in FIG. 2.

Figure 4:
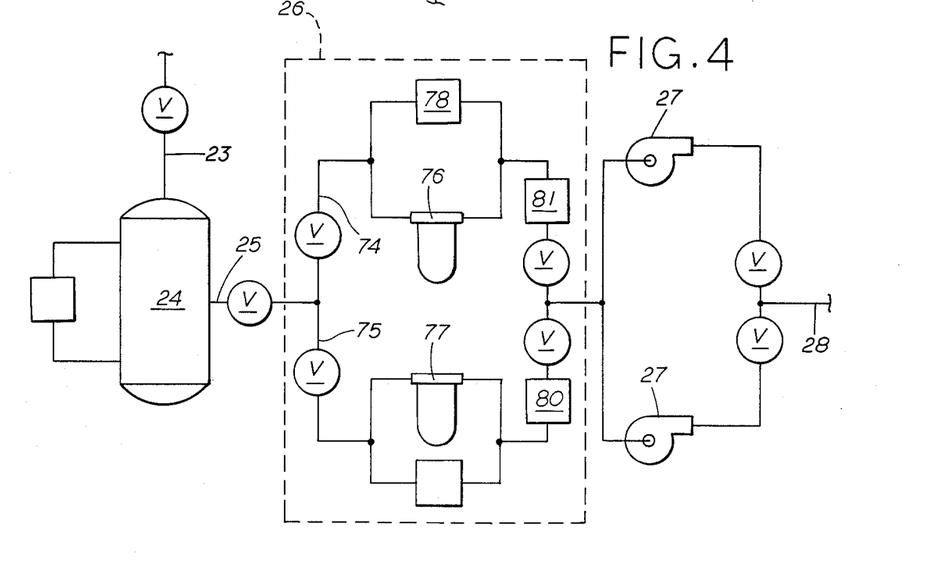

Referring now to FIG. 4, the polishing filter system 26, as illustrated in FIG. 2, will be described. The water stream enters the waste water break out storage tank 24 through line 23 and leaves by line 25. Again, this system is a redundant system similar to the filtration system 22 so only one half of the system will be described. The stream continues through line 74 into a micron cartridge filter 76. Attached to both sides of the cartridge filter 76 is a high pressure alarm and shut off device 78 which will shut the system down if the pressure gets too high at this point. Similar high pressure alarm and shut off devices 66a and 67a are shown across the sand filters 66 and 67 in FIG. 3. The water stream continues from the micron cartridge filter 76 through another guard screen 81 to be further treated for other use or transferred to the waste water injection pump 27 and into line 28. All of these filtration systems are parallel systems. Therefore, what has been described for one side is identical for the other side.

Figure 5:
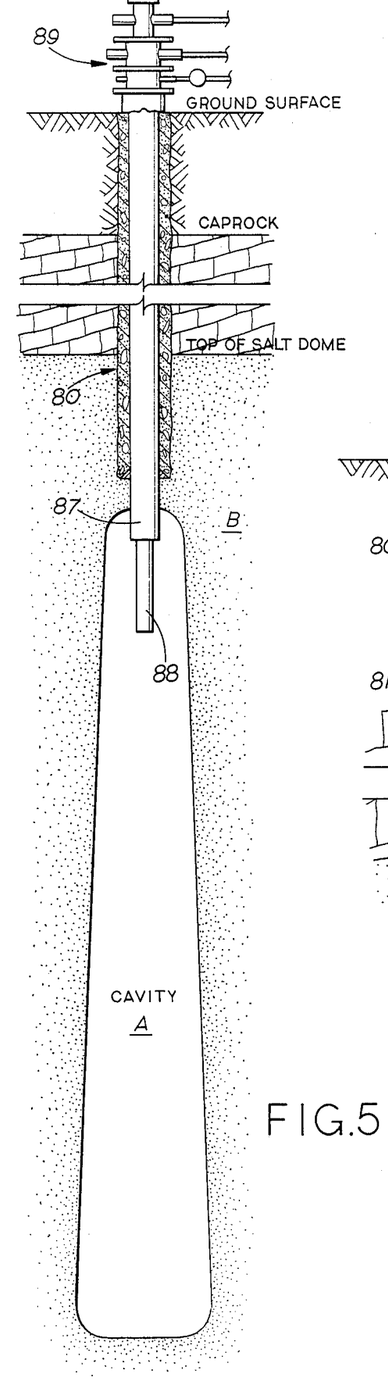
FIG. 5 illustrates an overall cross sectional view of the cavity within the salt formation created by the leaching process and simplified cross sectional view of the casing string extending from the surface down to the cavity.

FIG. 5 illustrates the cavity A leached out of the salt formation B and the casing string 80 as it extends from the surface of the ground through the earth and caprock and into the salt formation.

Figure 6:
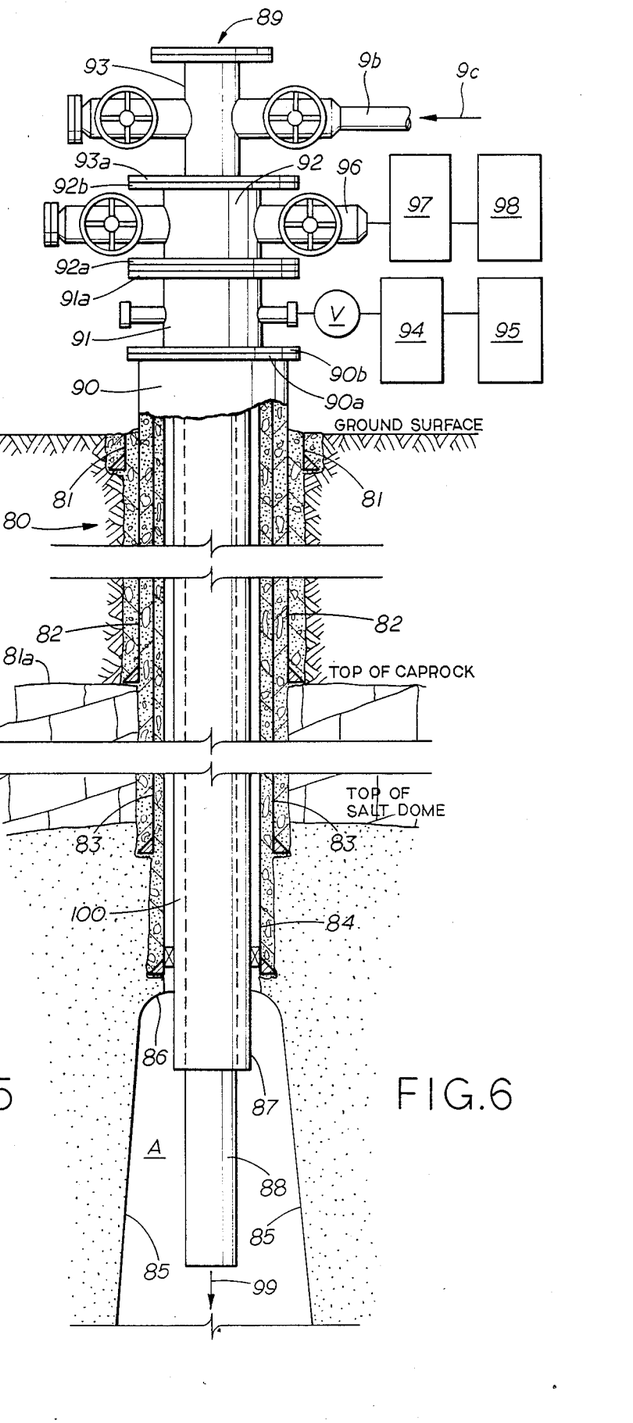
FIG. 6 illustrates a cross sectional detailed view of the casing string.

FIG. 6 illustrates the details of the casing string 80. A conductor casing 81 can be placed in either a drilled out hole and cemented into place or the conductor casing can be actually driven into the ground and then cemented in place. Then the bore hole is advanced down to at least the top of the caprock 81a and a surface casing 82 is placed within the bore hole and cemented in place back up to the surface. The bore hole is further advanced through the caprock 81a and down at least 100 feet into the top of the salt formation. Then, an intermediate casing 83 is placed in the bore hole down into the salt formation and cemented in place all the way back up to the surface. The bore hole is then further advanced another 500 feet into the salt formation and an inner casing 84 is placed in the hole and also cemented all the way back up to the surface. After the inner casing 84 is cemented in place, the bore hole is then further advanced all the way down to the bottom of the selected cavern depth. Then leaching tubes, not shown, are placed in the bore hole and the cavern is leached out to its desired size. After the leaching has been completed, the cavity A is formed as shown by lines 85. The top of the cavern 86 is at least 100 feet below the inner casing seat of the inner casing 84. Next, injection tubings are placed within the casing string 80. An outer tubing 87 is placed down the hole within the inner casing 84. The bottom of the outer tubing 87 is approximately 50 feet below the top of the cavern 86. An inner tubing 88 is then disposed within the outer tubing 87 and extends approximately 100 feet below the bottom of the outer tubing 87.

The well head assembly 89 is a forged steel assembly consisting of a plurality of spool components. The lower spool 90 is the extension of the surface casing 82 and connects the surface casing 82 with the intermediate casing 83 along with the inner casing 84. These casings are all connected to a welded plate 90a and provides for the first flange 90b for the spool 91 to be connected to. Spool 91 provides means for monitoring the atmosphere in the annulus between the inner casing 84 and the outer tubing 87. An annulus space monitoring device 94 is connected to spool 91 and is further attached to a pressure tank 95 which will always apply positive pressure to the annulus space between the inner casing 84 and the outer casing 87. Spool 91 has a flange 91a which is further connected to spool 92 by means of flange 92a. The outer tubing 87 is hung within the spool 92 by means well known in the art. Line 96 leaves spool 92 and connects to an air compressor 97 and a nitrogen tank 98 for supplying compressed air and a nitrogen mixture into the cavern. Spool 92 has a second flange 92b which further connects to spool 93 by flange 93a. The inner tubing 88 is hung within the spool 93 by means well known within the art. Line 9b running from the solidification unit 9a as illustrated in FIG. 2 connects to spool 93. Thus waste material coming from the solidification unit 9a enters the well head assembly 89 through line 9b, as shown by arrow 9c, and will fall down into the leached cavity A through the bottom of the inner tubing 88 as shown by arrow 99. Any air and nitrogen that may be in the cavity escapes through the annulus space 100 formed between the outer tubing 87 and the inner tubing 88 and can be released to the atmosphere through line 96.

Thus, a new, novel and unobvious method and apparatus has been described for the safe storage of hazardous waste in salt formations. While the foregoing description of the preferred embodiment of the invention has been described in terms of a method and apparatus for salt formation storage of hazardous waste, it will be apparent to one of ordinary skill in the art that the present invention could likewise be applied to the storage of other waste products. It will also be apparent that various changes may be made in the form, construction and arrangements of the parts thereof without departing from the spirit and scope of the invention, the description of the embodiment described herein being merely a preferred or exemplary embodiment thereof. It is further apparent that the process, method and apparatus described herein are not to be restricted to a single cavity within the salt formation, but can be repeated for multiple cavities within the salt formation after the first cavity becomes full as shown in FIG. 1.

Consequently, the foregoing description is not to be interpreted in a limiting manner. To the contrary, the present invention is to be limited only by the scope of the following claims.

We claim:

1. A method of storing waste material in an underground salt formation comprising the steps of:
    providing in the earth a passageway extending from the earth's surface down into the salt formation;
    leaching out a single cavity within said salt formation;
    receiving waste material into a processing plant complex;
    transferring the waste material into a chemical solidification unit;
    treating the waste chemically and solidifying the waste material;
    transferring the solid waste material down the passageway into the cavity within the salt formation by means of a plurality of injection tubes,
        wherein the receiving step includes receiving the waste material in the form of but not limited to organic and inorganic solids, semi-solids, liquids, sludges, hydrocarbons, solvents and waste water; and receiving acid and caustic materials for pH adjustment, and
    wherein the transferring step includes the steps of:
    transferring the waste material initially to a separator; and
    separating out the organic and inorganic solids, semi-solids, and sludges from the organic and inorganic liquids, hydrocarbons, solvents and waste water.

2. The method of claim 1 wherein the transferring step further includes:
    a. Transferring the organic and inorganic solids, semi-solids, and sludges to a sludge storage tank prior to transferring to the solidification unit; and
    b. Transferring the organic and inorganic liquids, hydrocarbons, solvents and waste water to an oil/water separator.

3. The method of claim 1 wherein the transferring step further includes:
    a. Separating the waste water from the organic and inorganic liquids, hydrocarbons, and solvents;
    b. Transferring the organic and inorganic liquids, hydrocarbons, and solvents to a hydrocarbon and organic matter storage tank prior to transferring to the solidification unit;
    c. Transferring the waste water to a waste water storage tank;
    d. Transferring the acids and caustic materials to the waste water storage tank;
    e. Transferring the waste water through a series of filters; and
    f. Treating and/or disposing the waste water.

4. The method of claim 3 wherein the transferring step further includes:
    a. Transferring the organic and inorganic solids, semi-solids, and sludges from the sludge storage tank to a solidification unit; and
    b. Transferring the organic and inorganic liquids, hydrocarbons, solvents and waste water from the hydrocarbon and organic matters storage tank to the solidification unit.

5. The method of claim 4 wherein the solidifying step includes:
    a. Adding a chemical agent and a pozzalonic material selected from the group consisting of but not limited to fly ash, cement kiln dust, cement, lime kiln dust calcium sulfate, blast furnace slag and/or steel mill bag house dust.

6. The method of claim 5 wherein the step of transferring the solid waste to the cavity within the salt formation includes:
   a. Conveying the solid waste from the solidification unit to the passageway through pipe or conveyor lines.

7. The method of claim 6 wherein the step of providing a passageway includes the steps of:
   a. Drilling a bore hole into the earth's surface and placing a conductor casing into the bore hole and cementing the conductor casing in place all the way back up the surface; then,
   b. Extending the bore hole into the earth's surface down to any caprock and placing a surface casing within said conductor casing and further cementing said surface casing in place all the way back up to the surface; then,
   c. Extending the bore hole through the caprock and into the salt formation and placing an intermediate casing within the surface casing and cementing the intermediate casing in place all the way back up to the surface; then,
   d. Extending the bore hole still further into the salt formation and placing an inner casing within the intermediate casing and cementing the inner casing in place all the way back up to the surface; then,
   e. Extending the bore hole still further into the salt formation and placing an outer tubing within the inner casing; then,
   f. Extending the bore hole still further into the salt formation and placing an inner tubing within the outer tubing;
   g. Providing a well head assembly on top of all of the casings on the earth's surface so that the solid waste material coming from the solidification unit can be depositing into the cavity through the inner tubing; and
   h. Providing monitoring equipment on the well head assembly to monitor the cavity and casings.

8. The method of claim 7 wherein the leaching process includes:
   a. Obtaining water and injecting the water down the passageway into the salt formation; and
   b. Withdrawing the water from the salt formation and disposing of it.

9. The method of claim 8 wherein the leaching process further includes:
   a. Storing the water temporarily in a first storage means prior to injecting it down into the formation through the passageway.

10. The method of claim 9 wherein the leaching process further includes:
    a. Allowing the water coming out of the formation to temporarily settle out in second storage means; and
    b. Passing the water through a series of filters prior to disposing of it.

11. In combination with a bore hole extending into a cavity formed within a salt formation, an apparatus for disposing of waste material comprising:
    a plurality of concentric internally disposed casing means extending down from the surface of the earth through the bore hole into the cavity formed within the salt formation;
    means for processing and transferring waste material into a solid mass and transferring said solid mass into the cavity through the casing means,
    wherein said processing and transferring means includes:
    receiving means for receiving organic and inorganic solids, semi-solids, sludges, hydrocarbons, solvents, waste water, acid and caustic materials;
    first separating means for separating the organic and inorganic solids, semi-solids and sludges from the organic and inorganic liquids, hydrocarbons, solvents and waste water;
    second separating means connected to said first separating means of separating the waste water from the organic and inorganic liquids, hydrocarbons and solvents;
    storage means for the separated acid and caustic material, organic and inorganic solids, semi-solids, sludges, organic and inorganic liquids, hydrocarbons, solvents and waste water;
    solidification means;
    transfer means for transferring said organic and inorganic solids, semi-solids, sludges, organic and inorganic liquids, hydrocarbons, solvents and waste water to said storage means; and
    waste water disposal means for disposing of the waste water outside the formation.

12. The apparatus of claim 11 wherein said storage means includes:
    a. A sludge storage tank connected to said first separating means;
    b. A hydrocarbon and organic matter storage tank connected to said second separating means;
    c. A waste water storage tank connected to said second separating means;
    d. An acid storage tank connected to the waste water storage tank; and
    e. A caustic storage tank connected to the waste water storage tank.

13. The apparatus of claim 12 wherein the transfer means includes:
    a. A first pipe line means connecting said first separating means to said sludge storage tank and further connecting said sludge storage tank to said solidification means;
    b. A sludge transfer pumping means positioned within said first pipe line means between said first separating means and said sludge transfer storage tank for transferring the sludge from the first separating means to the sludge storage tank or to the solidification means;
    c. A second pipe line means connecting said first separating means to said second separating means;
    d. A third separating means positioned within said second pipe line means to separate out any solids that might come down said second pipe line means;
    e. A third pipe line means connecting the second separating means to the hydrocarbon and organic storage tank and further connecting to said solidification means;
    f. A hydrocarbon transfer pumping means positioned within said third pipe line means to transfer the hydrocarbon and organic matter to the hydrocarbon and organic storage tank or to the solidification means;
    g. A fourth pipe line means connecting said second separating means to said waste water storage tank and from said waste water storage tank to said water disposal means;
    h. Filtration means positioned within said fourth pipe line means between said waste water storage tank and said waste water disposal means;

i. A fifth pipe line means connected between said receiving means and said acid storage tank further having a acid transfer pumping means disposed within said fifth pipe line means for transferring said acid to said acid storage tank;

j. A sixth pipe line means connected to said receiving means and to said caustic storage tank and further having a liquid caustic transfer pumping means disposed within said sixth pipe line means for transferring the caustic to the caustic storage tank;

k. A seventh pipe line means connecting said acid storage tank and said caustic storage to said waste water storage tank and further having a common transfer pumping means positioned within said seventh pipe line means for transferring either acid or caustic to the waste water storage tank;

l. An eighth pipe line means connected to the receiving means and running directly to the hydrocarbon and organic matter storage tank so as to bypass the first separating means;

m. A ninth pipe line means connected to the receiving means and running directly to the waste water storage tank so as to bypass the first separating means;

n. A tenth pipe line means connecting said solidification means directly to the casing means for depositing waste material directly into the cavity.

14. The apparatus of claim 13 wherein said casing means includes:

a. A first casing positioned within the earth and cemented in place;

b. A second casing disposed within said first casing and extending down from the bore hole to the top of any caprock and cemented in place;

c. A third casing disposed within said second casing extending down the bore hole and into the salt formation and cemented in place;

d. A fourth casing disposed within the third casing and extending down the bore hole to the top of the cavity and also cemented in place;

e. A fifth casing disposed within the said fourth casing and extending down the bore hole and into the cavity;

f. A sixth casing disposed within said fifth casing and extending down the bore hole and into the cavity below the bottom of the fifth casing;

g. A well head assembly positioned securely on top of all the casings providing communication between the sixth casing and the tenth pipe line means so that the water from the tenth pipe line means will be transferred into the cavity through the sixth casing.

* * * * *